United States Patent Office 3,399,986
Patented Sept. 3, 1968

3,399,986
NOVEL AMMONIUM POLYPHOSPHATES AND
METHODS FOR PREPARING THE SAME
Lenore Wiegman, New Brunswick, N.J., assignor to
American Cyanamid Company, Stamford, Conn.,
a corporation of Maine
No Drawing. Filed Aug. 31, 1965, Ser. No. 484,112
11 Claims. (Cl. 71—47)

ABSTRACT OF THE DISCLOSURE

An improved ammonium polyphosphate possessing a nonortho $P_2O_5$ content of at least 70% of the total $P_2O_5$ content, being nontacky, relatively noncaking, nonhygroscopic, friable and free-flowable as a powder is prepared by admixing ammonium phosphate with a selective adjuvant, such as calcium carbonate and dolomite, and heating the resultant mixture.

---

The present invention relates to novel ammonium polyphosphates having markedly improved physical and chemical properties and to methods for their preparation. More particularly, the invention relates to a process for the preparation from ammonium phosphates of nontacky, relatively noncaking, nonhygroscopic and friable ammonium polyphosphates possessing a nonortho $P_2O_5$ content of at least 70% of the total $P_2O_5$ present therein.

As is known, ammonium phosphate can be prepared from phosphoric acid by ammoniation. When the resultant ammonium phosphate is heated to temperatures above its melting point, for instance, to between 200° C. and 250° C., there is obtained an ammonium polyphosphate which is tacky, very hygroscopic and plasticlike. The latter is difficult both to handle and to store. In like manner, when superphosphoric acid prepared from phosphoric acid which is subjected to a sufficient heat treatment to remove substantially all the water therefrom, is treated with ammonia to prepare an ammonium polyphosphate, the product obtained contains not more than about 35% nonortho $P_2O_5$ based on the total $P_2O_5$ content. Further, this product possesses a substantially reduced nitrogen content as well as being plastic-like in appearance and touch. Such ammonium polyphosphate suffers from the same deficiencies as those products obtained by the former described process. However, if a process whereby a nontacky, noncaking, free-flowing ammonium polyphosphate could be provided, such a process would fulfill a long-felt need.

To this end, it has been surprisingly found that the disadvantages of the prior practice could be overcome by the use of a straightforward process involving heating of ammonium phosphate directly with a sufficient amount of a selective oxide or carbonate additive. Unexpectedly, when heated at temperatures above the melting point of the ammonium phosphate, there is obtained a noncaking, nontacky, free-flowing ammonium polyphosphate in good yield.

According to the process of the invention, an ammonium phosphate, such as monoammonium phosphate or diammonium phosphate, is admixed with a selective oxide or carbonate. Usually, from about 5% to about 30% and, preferably, between about 10% and about 20% by weight of: calcium oxide, calcium carbonate, manganese carbonate, magnesium carbonate, sodium carbonate, sodium bicarbonate or mixtures thereof, such as dolomite and equivalents thereof, based on the weight of the ammonium phosphate being treated, can be readily utilized. Thereafter, the mixture is heated to a temperature between about 210° C. and 260° C., and preferably between about 220° C. and 250° C. Advantageously, the ammonium polyphosphate so prepared possesses a nonortho $P_2O_5$ content between about 70% and about 90% of the total $P_2O_5$ content.

The time of heating employed hereinabove will range from about 15 minutes to about 60 minutes. A good practice employs a time interval usually between 20 minutes and 40 minutes. However, little substantial improvement is noted where heating occurs above about one hour and no significant improvement is noted when the time of heating is less than about 15 minutes.

Advantageously, a porous, monolithic mass which is nontacky and flowable is obtained following the procedure of the present invention. This mass is less hygroscopic than a control material prepared from ammonium phosphate without additive, to the extent that the mass as prepared in accordance with the invention is from 20% to 40% less hygroscopic of the control material. The resultant product is also quite friable and can be ground to a flowable powder which retains the attributes of nontackiness, noncaking and flowability.

In general, where an additive, such as potassium carbonate, ammonium carbonate, zinc carbonate, triple superphosphate, ground phosphate rock, calcium sulfate, magnesium sulfate, magnesium oxide or manganese oxide is substituted for each of the aforementioned additives employed in admixture with ammonium phosphate, there results products which are sticky, hygroscopic and non-flowable.

The invention will be illustrated in conjunction with the following examples which are to be taken as illustrative only and not by way of limitation.

EXAMPLE 1

In this example samples of both monoammonium phosphate (MAP) and diammonium phosphate (DAP) were independently ground to a finely divided state and analyzed by standard well known methods for nitrogen and $P_2O_5$ content following the procedure in "Quantitative Inorganic Analysis," Sharlot et al., pp. 507–515, for $N_2$ determination and the Journal of Association of Official Agricultural Chemists, vol. 47, page 413, for the total $P_2O_5$ determination. A plurality of seven gram samples of each of the latter analyzed materials were individually added to a suitable vessel and then admixed with finely ground calcium carbonate at varying percentage levels commencing with 5% and concluding with 25%, based on the weight of the ammonium phosphate. Resultant mixtures were then placed in an oven and heated to predetermined temperature for 30 minutes. At the end of the time interval, the samples were cooled, weighed and analyzed for nitrogen, total $P_2O_5$ content and nonortho $P_2O_5$ content. The products are found to be friable, nontacky, porous masses which when ground yield a free-flowing nontacky powder and have a nonortho $P_2O_5$ content of at least 70%.

In the nonortho $P_2O_5$ determination, two portions of equal volume were taken from a treated solution containing ortho and nonortho phosphates at predetermined intervals. One part of sample was digested with concentrated nitric acid. The other portion was no so-treated, but a few drops of concentrated ammonium hydroxide were added to prevent hydrolysis of polyphosphate. Each portion was treated with a molybdatevandate reagent and then the absorbance of each solution was determined employing a spectrophotometer. Percent nonortho $P_2O_5$ was then calculated using the absorbance data obtained.

The degree of hygroscopicity of the treated samples was determined by weighing each of the treated samples, placing the same in a chamber in which the temperature and humidity were maintained as a constant for five hours at 30° C. and 75% relative humidity. The samples were then reweighed and the results of this test in conjunction with the determination outlined above are reported in Table I below.

ing 260° C. in the absence of an additive, the following example is presented.

TABLE I

| Materials | Before heating | | | | Heating cond. | | After heating | | | | | |
|---|---|---|---|---|---|---|---|---|---|---|---|---|
| | Percent N | Percent $P_2O_5$ | $N/P_2O_5$ | Percent $CaCO_3$ | Temp., (° C.) | Time, (hr.) | Percent N | Percent $P_2O_5$ | $N/P_2O_5$ | Percent nonortho $P_2O_5$ | Percent wt. loss | Percent wt. gain humidity test |
| DAP | 19.73 | 48.09 | 0.4103 | 5.38 | 185 | ½ | 11.00 | 54.82 | 0.2007 | 23.37 | 16.99 | 15.67 |
| DAP | 19.73 | 48.09 | 0.4103 | 24.99 | 185 | ½ | 8.60 | 42.84 | 0.2007 | 30.55 | 15.79 | 10.87 |
| MAP | 12.22 | 53.24 | 0.2295 | 5.01 | 185 | ½ | 10.87 | 54.74 | 0.1986 | 27.60 | 7.61 | 16.29 |
| MAP | 12.22 | 53.24 | 0.2295 | 25.02 | 185 | ½ | 8.93 | 42.72 | 0.2090 | 27.44 | 6.56 | 6.82 |
| DAP | 19.73 | 48.09 | 0.4103 | 4.96 | 210 | ½ | 10.22 | 60.78 | 0.1681 | 83.60 | 24.81 | 39.70 |
| DAP | 19.73 | 48.09 | 0.4103 | 25.03 | 210 | ½ | 7.30 | 47.29 | 0.1544 | 79.10 | 23.76 | 15.94 |
| MAP | 12.22 | 53.24 | 0.2295 | 4.97 | 210 | ½ | 10.11 | 59.53 | 0.1698 | 73.21 | 10.01 | 40.40 |
| MAP | 12.22 | 53.24 | 0.2295 | 25.02 | 210 | ½ | 7.40 | 48.06 | 0.1540 | 72.98 | 16.94 | 17.19 |
| DAP | 19.73 | 48.09 | 0.4103 | 4.99 | 217 | ½ | 9.63 | 61.30 | 0.1571 | 77.67 | 25.47 | 36.23 |
| DAP | 19.73 | 48.09 | 0.4103 | 15.01 | 217 | ½ | 8.10 | 55.55 | 0.1458 | 83.66 | 26.40 | 22.40 |
| MAP | 12.22 | 53.24 | 0.2295 | 5.01 | 217 | ½ | 9.81 | 60.20 | 0.1630 | 82.46 | 15.99 | 38.67 |
| MAP | 12.22 | 53.24 | 0.2295 | 15.00 | 217 | ½ | 8.34 | 55.58 | 0.1501 | 75.81 | 18.64 | 24.32 |
| DAP | 19.73 | 48.09 | 0.4103 | 10.00 | 234 | ½ | 7.94 | 60.04 | 0.1322 | 89.03 | 27.82 | 29.90 |
| MAP | 12.22 | 53.24 | 0.2295 | 10.02 | 234 | ½ | 8.33 | 60.17 | 0.1384 | 83.54 | 20.38 | 32.91 |
| DAP | 19.73 | 48.09 | 0.4103 | 5.01 | 249 | ½ | 8.61 | 63.75 | 0.1351 | 84.67 | 28.34 | 36.25 |
| DAP | 19.73 | 48.09 | 0.4103 | 15.01 | 249 | ½ | 6.91 | 58.02 | 0.1191 | 81.38 | 29.55 | 24.46 |
| MAP | 12.22 | 53.24 | 0.2295 | 4.99 | 249 | ½ | 8.99 | 62.81 | 0.1431 | 79.41 | 19.46 | 36.25 |
| MAP | 12.22 | 53.24 | 0.2295 | 15.03 | 249 | ½ | 6.95 | 58.67 | 0.1185 | 84.99 | 22.89 | 25.19 |

Substantially similar results are obtained when substituting manganese carbonate, magnesium carbonate, sodium carbonate or sodium bicarbonate for the calcium carbonate additive in this example.

EXAMPLE 2

The effectiveness of calcium oxide in producing a high nonortho $P_2O_5$ content ammonium polyphosphate directly from ammonium phosphate was demonstrated by admixing finely divided calcium oxide with both diammonium phosphate and monoammonium phosphate and heating each sample to a temperature between 220° C. and 250° C. for 30 minutes. The resultant products are cooled and analyzed following the procedures outlined in Example 1 above. The data obtained are set forth in Table II below. It will be apparent from a consideration of this table that the products in the above treatment employing 10% to 15% by weight of calcium oxide are finely divided, free-flowing and nontacky solids having a nonortho $P_2O_5$ content greater than 70%.

Substituting dolomite for the calcium oxide hereinabove and repeating the example in every detail, a relatively noncaking, nontacky, friable and nonhygroscopic ammonium polyphosphate is obtained.

Diammonium phosphate and monoammonium phosphate were each heated with no additive at a temperature between about 275° C. and 300° C. for 30 minutes following the analysis of $P_2O_5$ content as outlined in Example 1 above. There results an 80% conversion to the nonortho form in each sample treated. However, the resultant products were tacky, hygroscopic and plastic-like in feel and appearance.

I claim:

1. An improved ammonium polyphosphate composition possessing a nonortho $P_2O_5$ content of at least 70% of the total $P_2O_5$ content, said ammonium polyphosphate being nontacky, relatively noncaking, nonhygroscopic, friable and when ground to a powder is free flowable, and said ammonium polyphosphate being prepared by the process of claim 2.

2. A method for preparing a nontacky, noncaking, nonhygroscopic and friable ammonium polyphosphate composition comprising the steps of: admixing ammonium phosphate with from about 5% to about 30% by weight of an additive selected from the group consisting of calcium carbonate, calcium oxide, magnesium carbonate, sodium carbonate, sodium bicarbonate, dolomite and manganese carbonate, heating resultant composition

TABLE II

| Materials | Before heating | | | | Temp. (° C.) | After heating | | | | | |
|---|---|---|---|---|---|---|---|---|---|---|---|
| | Percent N | Percent $P_2O_5$ | $N/P_2O_5$ | Percent CaO | | Percent N | Percent $P_2O_5$ | $N/P_2O_5$ | Percent nonortho | Percent wt. lost | Percent wt. gain |
| DAP | 19.73 | 48.09 | 0.4103 | 2.02 | 220 | | 61.79 | | 61.30 | 22.17 | 36.31 |
| DAP | 19.73 | 48.09 | 0.4103 | 10.07 | 220 | 8.16 | 63.14 | 0.1292 | 75.68 | 23.84 | 25.45 |
| DAP | 19.73 | 48.09 | 0.4103 | 15.13 | 220 | 6.56 | 63.02 | 0.1041 | 69.01 | 23.70 | 19.77 |
| MAP | 12.22 | 53.24 | 0.2295 | 2.04 | 220 | | 62.37 | | 65.90 | 14.65 | 35.02 |
| MAP | 12.22 | 53.24 | 0.2295 | 10.13 | 220 | 8.32 | 63.22 | 0.1316 | 78.11 | 15.78 | 26.84 |
| MAP | 12.22 | 53.24 | 0.2295 | 15.11 | 220 | 7.06 | 63.28 | 0.1116 | 75.28 | 15.87 | 21.12 |
| DAP | 19.73 | 48.09 | 0.4103 | 2.02 | 250 | | 64.17 | | 55.38 | 25.06 | 41.67 |
| DAP | 19.73 | 48.09 | 0.4103 | 10.08 | 250 | 7.50 | 65.89 | 0.1138 | 83.50 | 27.09 | 26.87 |
| DAP | 19.73 | 48.09 | 0.4103 | 15.12 | 250 | 5.60 | 65.63 | 0.0853 | 80.08 | 26.72 | 19.96 |
| MAP | 12.22 | 53.24 | 0.2295 | 2.05 | 250 | | 64.00 | | 58.02 | 16.82 | 39.45 |
| MAP | 12.22 | 53.24 | 0.2295 | 10.03 | 250 | 7.73 | 65.48 | 0.1181 | 85.26 | 18.70 | 27.37 |
| MAP | 12.22 | 53.24 | 0.2295 | 15.08 | 250 | 5.96 | 65.44 | 0.0911 | 82.81 | 18.65 | 23.08 |

EXAMPLE 3

The procedure of Example 1 is followed in every detail except that 10% by weight of finely divided phosphate rock, potassium carbonate, triple superphosphate and zinc carbonate were each substituted for the calcium carbonate additive. The samples were heated to 250° C. for 30 minutes. Resultant products were found to be tacky, hygroscopic and plastic-like and exhibited no interaction between each of the additives and the ammonium phosphate treated.

EXAMPLE 4

To show the effect of heating diammonium phosphate and monoammonium phosphate at temperatures exceedto a temperature between 210° C. and 260° C. for a period from 15 minutes to about 60 minutes, and cooling said resultant composition.

3. A method according to claim 2 in which the ammonium phosphate is monoammonium phosphate.

4. A method according to claim 2 in which the ammonium phosphate is diammonium phosphate.

5. A method according to claim 2 wherein the additive is calcium carbonate.

6. A method according to claim 2 wherein the additive is calcium oxide.

7. A method according to claim 2 wherein the additive is manganese carbonate.

8. A method according to claim 2 wherein the additive is sodium carbonate.

9. A method according to claim 2 wherein the additive is sodium bicarbonate.

10. A method according to claim 2 wherein the additive is magnesium carbonate.

11. A method according to claim 2 wherein the additive is dolomite.

References Cited

UNITED STATES PATENTS 1,953,419   4/1934   MacIntire _____ 71—9

OSCAR R. VERTIZ, *Primary Examiner.*

L. A. MARSH, *Assistant Examiner.*